United States Patent [19]

Gold

[11] Patent Number: 4,697,797
[45] Date of Patent: Oct. 6, 1987

[54] COMBINATION PNEUMATIC SPRING AND SHOCK ABSORBING APPARATUS

[76] Inventor: Henning Gold, Im Rheinblick 29, 6530 Bingen 1, Fed. Rep. of Germany

[21] Appl. No.: 728,270

[22] Filed: Apr. 29, 1985

[30] Foreign Application Priority Data

Apr. 30, 1984 [DE] Fed. Rep. of Germany ... 8413300[U]

[51] Int. Cl.[4] .......................... F16F 9/02; F16F 9/34; B60G 17/04
[52] U.S. Cl. .................................. 267/64.24; 267/27
[58] Field of Search ............... 267/64.21, 64.24, 64.27, 267/64.19, 64.23, 35, 63 R, 63 A, 153, 152, 8 R; 188/322.17, 322.16, 321.11; 280/668, 710

[56] References Cited

U.S. PATENT DOCUMENTS

| | | | |
|---|---|---|---|
| 2,624,592 | 1/1953 | MacPherson | 267/8 R |
| 2,660,449 | 11/1953 | MacPherson | 280/668 |
| 2,922,635 | 1/1960 | Delorean | 267/64.21 |
| 3,353,813 | 11/1967 | Erdmann et al. | 267/8 R |
| 3,870,286 | 3/1975 | Willich | 267/8 R |
| 3,954,257 | 5/1976 | Keijzer et al. | 267/64.21 |
| 4,067,558 | 1/1978 | Keijzer et al. | 267/8 R |
| 4,206,907 | 6/1980 | Harrod | 267/8 R |
| 4,256,292 | 3/1981 | Sullivan et al. | 267/8 R |
| 4,434,977 | 3/1984 | Chiba et al. | 267/8 R |
| 4,462,608 | 7/1984 | Lederman | 267/8 R |
| 4,531,759 | 7/1985 | Rezawka et al. | 267/8 R |
| 4,555,096 | 11/1985 | Pryor | 267/8 R |

Primary Examiner—John W. Caldwell, Sr.
Assistant Examiner—Alvin Oberley
Attorney, Agent, or Firm—Karl Hormann

[57] ABSTRACT

A novel pneumatic spring-loaded damping apparatus having a piston mounted for reciprocal movement within a cylindrical housing and provided with a piston rod which at extends through a resilient chamber provided by a rolling bellows at one end of the housing, the rolling bellows being mounted for rotation relative to the housing or the piston rod to provide a strut for a steerable front wheel of an automotive vehicle.

12 Claims, 7 Drawing Figures

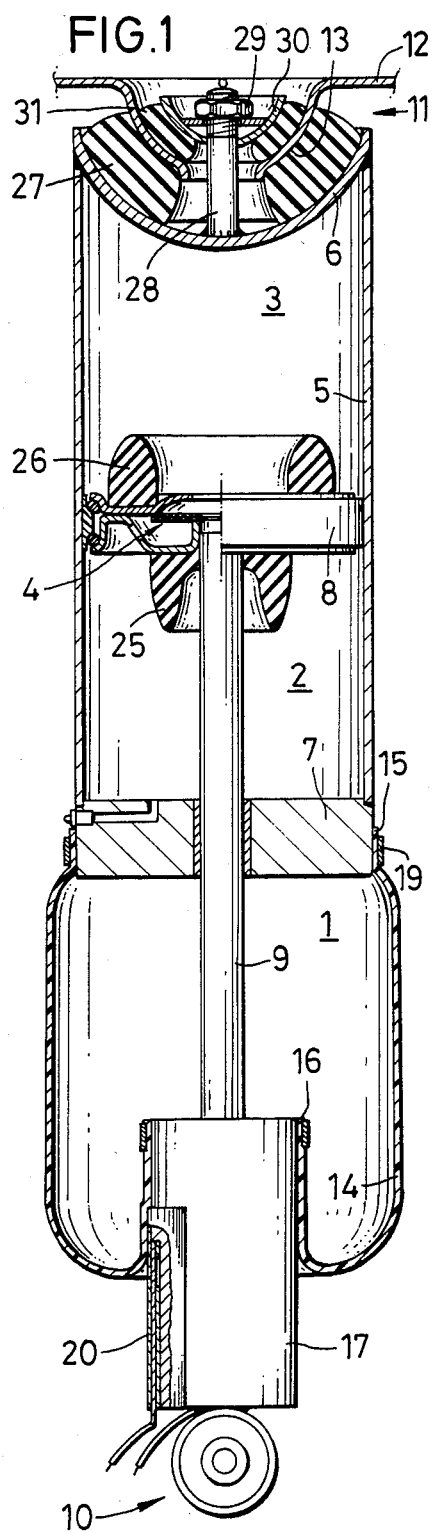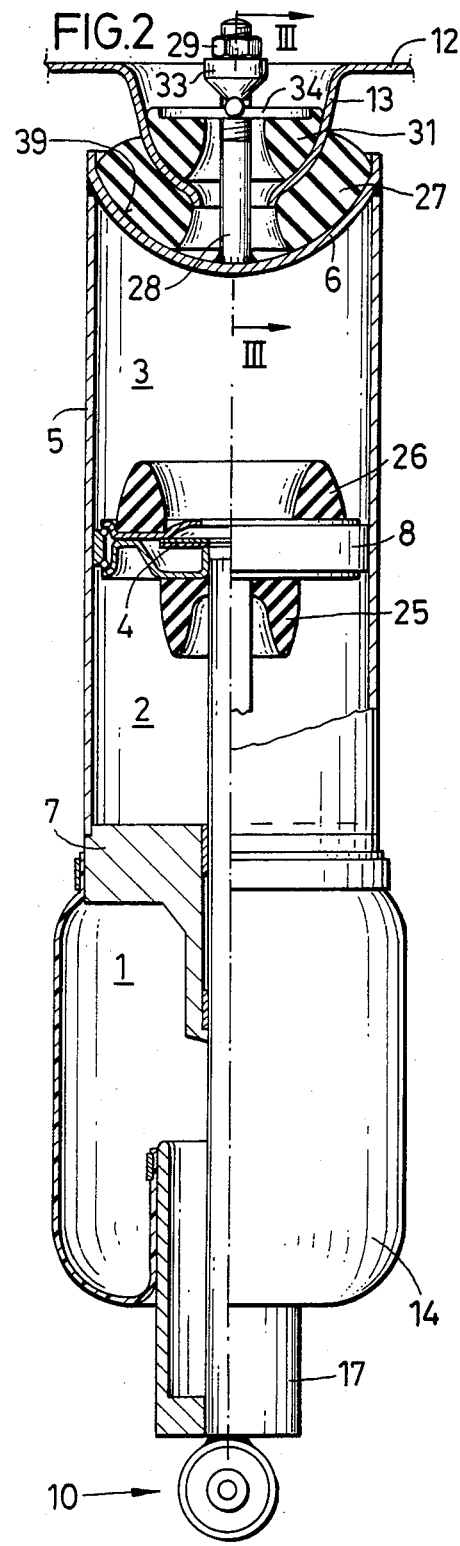

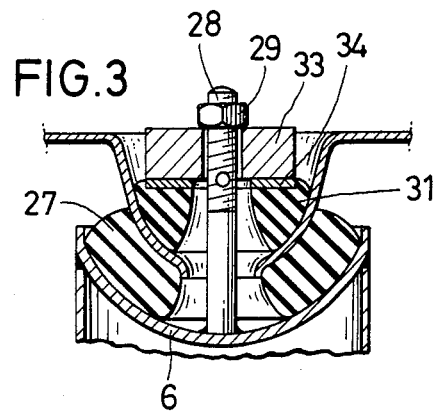
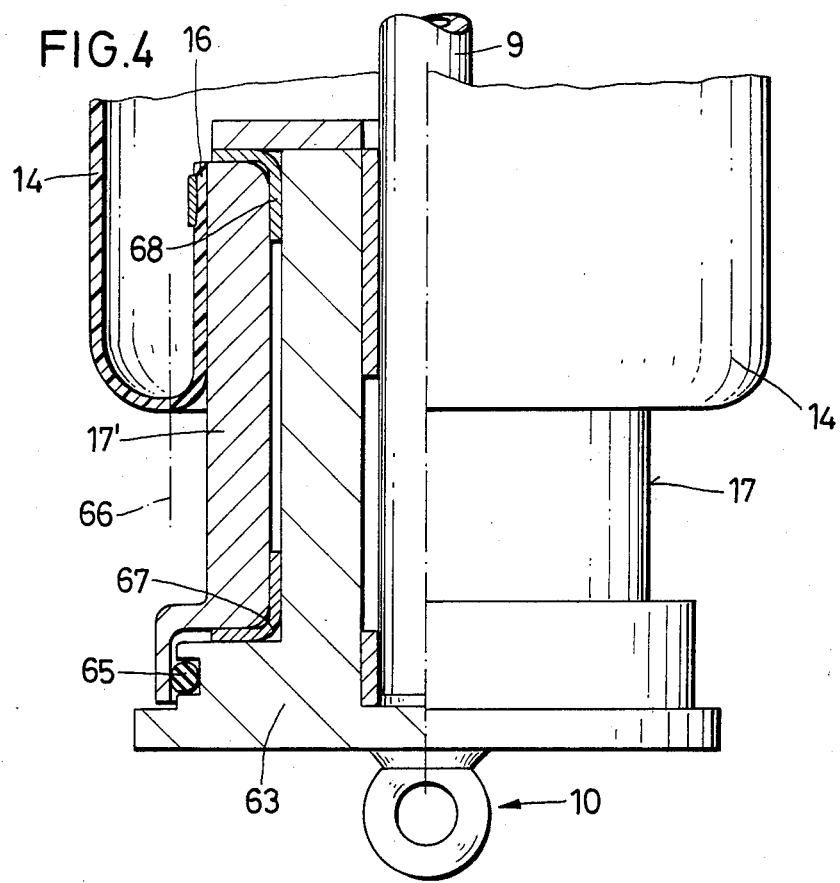

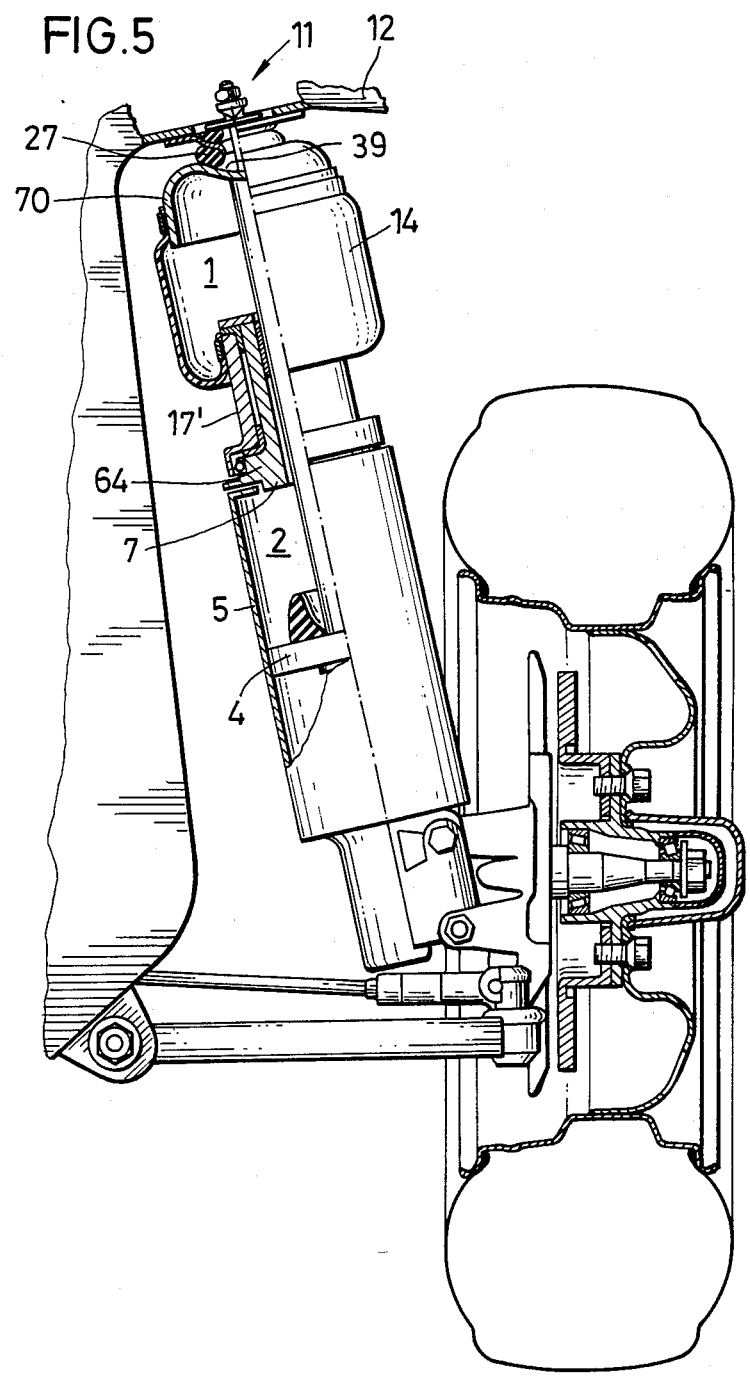

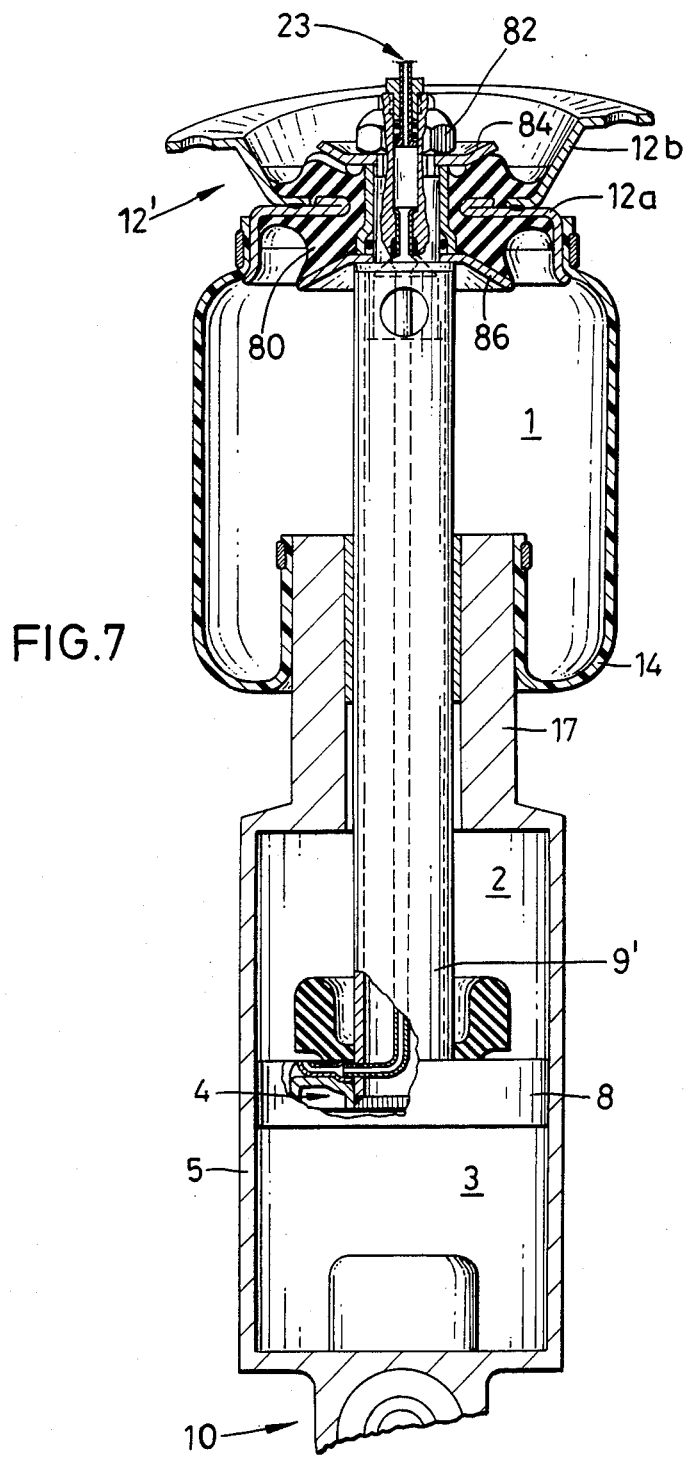

COMBINATION PNEUMATIC SPRING AND SHOCK ABSORBING APPARATUS

The present application is related to my copending Applications Ser. No. 722,565, now U.S. Pat. No. 4,635,959 and 728,618 now U.S. Pat. No. 4,647,025 filed contemporaneously herewith.

The invention relates generally to a combination pneumatic spring and shock absorber apparatus. More particularly, the invention relates to a so-called spring-loaded damping unit, i.e. an apparatus combining the hitherto usually separate elements of a coil spring and shock absorber as used, for instance, in automotive wheel suspension systems.

Spring-loaded damping units of the kind here under consideration are generally known from the Applicant's dissertation which is on file at the Institut für Kraftfahrwesen und Kolbenmaschinen der Rheinisch-Westfälischen Technischen Hochschule (Institute for Automotive Engineering and Piston Machines of the Rhenish-Westfalian Technical University) at Aachen, West Germany.

Typically, such apparatus comprises a cylindrical housing having top and bottom closures and provided with a first mounting bracket, a piston mounted for reciprocal movement within the chamber and dividing it into shock absorbing chambers of respectively increasing and decreasing volumes when the apparatus is subjected to compression (and vice versa during expansion), throttle means within the piston for providing exchange of pressure in both directions between the chambers, a piston rod affixed to the piston and extending through one of the closures and through a resilient chamber formed by a rolling bellows connected to the housing and to the piston rod for sealing the resilient chamber, and a second mounting bracket mounted at an end of the piston rod.

The spring as well as the shock absorbing or damping functions of such an apparatus are substantially exclusively pneumatic. The center position of the apparatus is maintained by adding or venting air. Thus, the apparatus automatically adjusts to changes in loads to which it may be subjected; accordingly, the apparatus is of particular advantages for use in automotive vehicles carrying loads of varying magnitudes because it assures comfortable spring action independently of the load supported. The damping action of the apparatus is frequency selective, i.e. it allows effectively to dampen resonant vibrations without generating excessive damping forces at hypercritical excitations.

It is an object of the present invention to provide for an improved pneumatic spring-loaded damping apparatus.

A further object of the invention is to provide such an apparatus of simplified construction and improved performance.

Still another object of the invention resides in the provision of an apparatus of the kind under consideration which requires fewer parts for its assembly than prior art devices.

Yet another object of the invention is to provide for an integral spring-loaded damping unit made of few light weight parts of simple construction.

It is a more specific object of the invention to provide a spring-loaded damping unit for use with suspensions of steerable front wheels of automotive vehicles.

A particular object of the invention is to provide a spring-loaded damping unit useful as a strut in connection with the suspension of a steerable front wheel of an automobile.

In the accomplishment of these and other objects, the invention provides for a spring-loaded damping apparatus of the kind referred to above in which the connection between the rolling bellows and the cylindrical housing and/or the piston rod is a rotatable one.

Advantageously, the rotatable connection provides for a hermetic seal. The connection may be formed by a sleeve which is mounted for rotation relative to the housing and/or the piston rod. Preferably, the sleeve comprises a support for the rolling bellows. Advantageously, the seal between the sleeve and the housing or the piston rod is formed by a packing ring having a diameter substantially equal to the effective diameter of the rolling bellows. In a particularly advantageous embodiment of the invention a support surface of one of the mounting brackets comprises a substantially semi-spherical indentation with a resilient washer concentrically provided therein for supporting a bulged portion of a supported structure. Advantageously, the top closure of the housing comprises a semi-spherical indentation. In another advantageous embodiment of the invention the rolling bellows may be rigidly connected to a supported structure by way of a cup-shaped member and the piston rod may be elastically retained within a resilient bearing mounted within the cup-shaped member. The cup-shaped member may be rigidly connected to a mounting bracket, and the resilient bearing may be attached to the cup-shaped member and mounting bracket by vulcanization. The cup-shaped member and the mounting bracket may form an integral mounting bracket for supporting an automotive chassis.

Other objects and advantages of the invention will in part be obvious and will in part become apparent upon full consideration of the following detailed description and attached drawing in which FIG. 1 is a view, in longitudinal section, of a spring-loaded damping apparatus in accordance with the invention;

FIG. 2 is a view, in longitudinal section, of an alternate embodiment of the invention;

FIG. 3 is a detailed view along section line III—III of FIG. 2;

FIG. 4 is a view, partially in section, of a rotatably mounted support sleeve;

FIG. 5 is a view of a front-wheel suspension incorporating a spring-loaded damping apparatus in accordance with the invention;

FIG. 7 is a view, in longtudinal section, of a further embodiment of a spring-loaded damping apparatus having a top-mounted resilient chamber.

Figure 6:
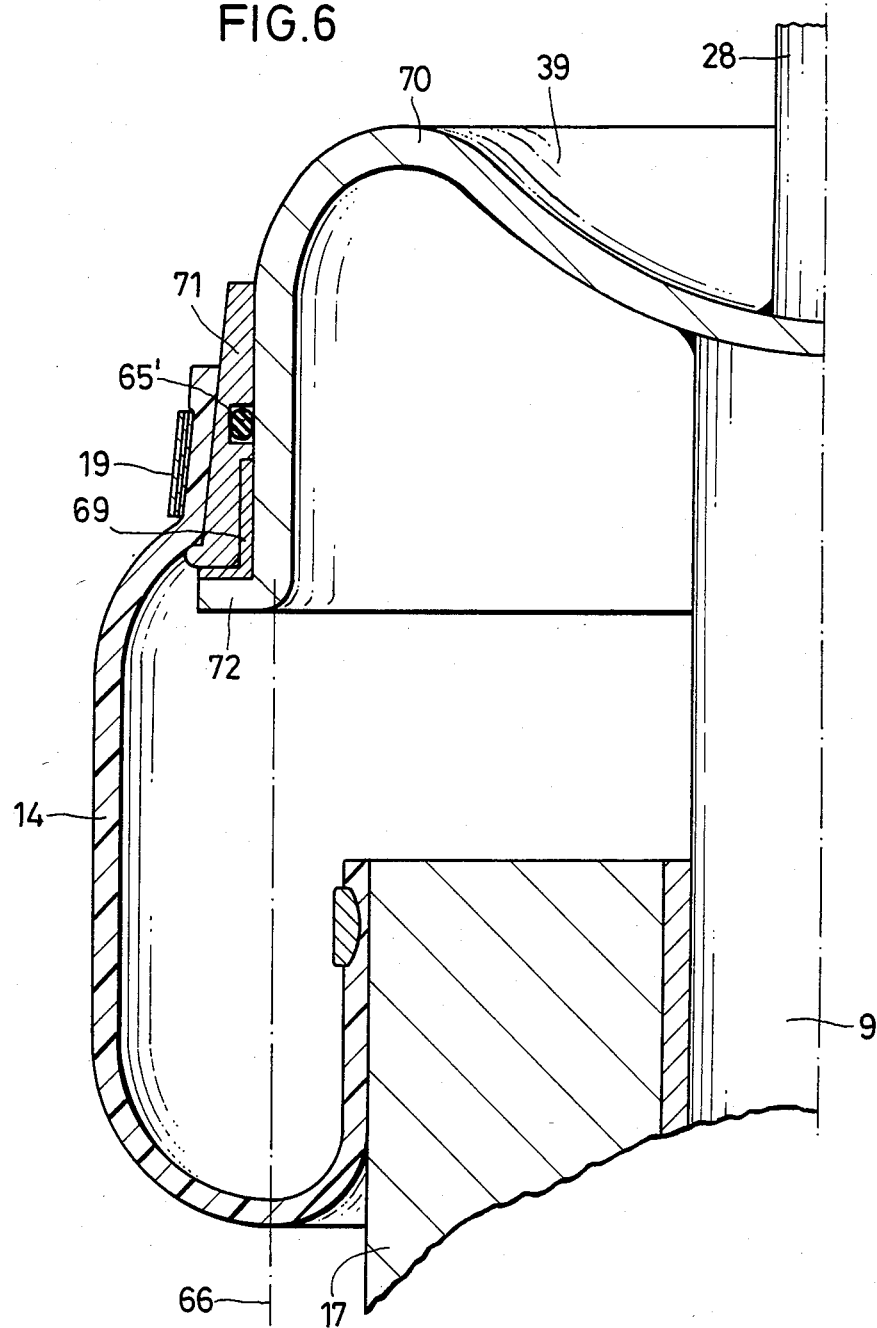
FIG. 6 is a view, partially in section, of a resilient bellows and a rotatable connection thereof.

As may be seen by reference to FIG. 1 the spring-loaded damping apparatus comprises a resilient chamber 1 and two absorption chambers 2 and 3. The resilient chamber 1 is enclosed by a rolling bellows 14 made of resilient material, and the absorption chambers 2 and 3 are located within a cylindrical housing 5. The separation between the chambers 2 and 3 is provided by a piston 8 which is mounted for reciprocal movement within the housing 5. Movement is imparted to the piston 8 by compression or expansion of the apparatus. In the arrangement shown and as will become more apparent from the ensuing description, whenever the apparatus is compressed the volumes of the resilient chamber 1 and of the absorption chamber 3 are decreased whereas the volume of the absorption chamber 2 is increased. The reverse is, of course, true during expansion of the apparatus. Such movements are transferred to the piston 8 by a piston rod 9 affixed to the piston 8. The housing is provided with a top closure 6 and with a bottom closure 7. The piston rod 9 extends through the absorption chamber 2 and through the bottom closure 7 which for this purpose is provided with an appropriate packing sleeve. The piston rod 9 also extends through the resilient chamber 1. The bellows 14 is affixed, at one end, to a sleeve 17 mounted on the piston rod 9. The sleeve 17 provides a rolling surface for the bellows 14 during movement of the piston 8 within the housing 5. The sleeve 17 is provided with a mounting bracket 10. Another mounting bracket 11 is seen to be provided adjacent the top closure 6 of the housing 5. The apparatus may be mounted, for instance, by attaching the bracket 11 to a support structure 13 of an automotive chassis 12 and by attaching the bracket 10 to an axle of a automotive wheel.

There is provided within the piston 8 a throttle member 4 which provides for bidirectional exchange of pneumatic pressure between the absorption chambers 2 and 3. Also, an externally controllable throttle member (not shown) may be provided within the bottom closure 7 for connecting the resilient chamber 1 with the absorption chamber 2 for altering the resilient and absorptive characteristics of the apparatus. Furthermore, the absorption chamber 3 may be connected with the resilient chamber 1. Such a connection may be provided with or without appropriate throttle means and may be controllable by external means. It may be provided by a conduit (not shown) in the piston rod 9 and by apertures in the sleeve (17) (also not shown).

The other end 15 of the rolling bellows 14 is attached to the cylindrical housing 5 adjacent the bottom closure 7, by means of a clamp 19. As stated above, the end 16 of the bellows 14 is attached to the sleeve 17.

A pressure level switch 20 may be mounted on the sleeve 17 to provide signals representative of the pneumatic pressure within the apparatus. These signals may serve to feed appropriate control circuitry (not shown) for adjusting the pneumatic pressure within the housing in accordance with changes in the load supported by the apparatus.

For purposes of providing for an effective acoustic insulation between the apparatus and a mass to be supported by it, the upper mounting bracket 11 may comprise a resiliently soft cushion or washer 27 of large surface area. By seating the washer 27 within a semispherical indentation 39 formed in the outer surface of the upper closure 6 the effects of transversal torque arising out of pivotal movements of the apparatus may be substantially eliminated. For this reason the chassis or frame to be supported by the apparatus is advantageously provided with a semi-spherical bulge 13 complementing the shape of the indentation 39 or cushion 27.

Separation of the chassis 13 from the apparatus is prevented by a threaded bolt 28 mounted on the outer surface of the upper closure 6. Advantageously, the bolt 28 is centrally mounted within the semispherical indentation 39. A nut 29 is threadedly received on the bolt 28 and in the embodiment shown is seated against a semispherical tension member 30. A space remaining between the tension member 30 and the bulge 13 is substantially filled by a resilient washer 31 of lesser volume than the washer 27.

In accordance with the embodiment shown in FIGS. 2 and 3 the tension member may comprise an elongated member 33 having a downwardly pointing central edge 32 in engagement with a washer 34 supported by the resilient washer 31. By tightening the nut 29 the resilient washers 27 and 31 on opposite sides of the bulge 13 are biased against each other. Preferably, the elongated member 33 is positioned such that its central edge 32 coincides with the major pivot axis of the spring-loaded damping apparatus.

The apparatus in accordance with the invention may advantageously be used in connection with front wheel suspensions of automotive vehicles. As shown in FIGS. 4, 5 and 6, the apparatus in accordance with the invention eliminates the need for an upper vertical pivot joint by connecting the rolling bellows 14 in such a manner that the housing 5 with its absorption chambers 2 and 3 may be rotated or pivoted about its own axis relative to the bellows 14. For this purpose the sleeve 17 as shown in the embodiment of FIG. 4 is rotatably mounted at the lower end of the piston rod 9. An airtight seal is provided between the sleeve 17 and a bearing member 63 attached to the piston rod 9 by means of an elastic washer or O-ring 65. As shown the radius of the sealing ring 65 substantially correspondes to the effective radius 66 of the rolling bellows 14. In this manner axial stress in the bellows 14 is substantially prevented and simple bushings 67 and 68 suffice for rotatably supporting the bellows 14. Rotationally effective torques are substantially suppressed also.

The sealing ring 65 may also be seated in a location deviating somewhat from the effective radius of the bellows 14. While such an arrangement may give rise to small axial forces they may nevertheless be desirable for positioning the elements of the assembly.

As shown in FIG. 4 the sleeve 17' is seated on a bearing block 63 which is mounted on the free end of the piston rod 9. Rotatability of the sleeve 17' relative to the bearing block 63 is made possible by bushings 67 an 68.

FIG. 5 depicts an alternate embodiment of the invention in which the rolling bellows 14 is attached to a cup-shaped member 70, by its end having the larger diameter. The cup-shaped member 70 is affixed to the piston rod 9. The sleeve 17', in accordance with this embodiment, is seated upon a bearing block 64 which is connected to the closure 7 of the housing 5, i.e. the piston rod 9 extends through the closure 7 as well as through the bearing block 64. The cup-shaped member 70 is provided with a concave axial recess 39 for supporting a resilient washer 27 in the manner of the previously described embodiment. In the embodiment of FIG. 5 the housing 5 may be rotated relative to the bellows 14 as well as the piston rod 9.

Another embodiment is shown in FIG. 6. As in the previously described embodiments the rolling bellows 14 has opposite ends of different diameters. Here, the end having the larger diameter is seated upon the outer surface of a sleeve 71 shown to be conical in longitudinal section. The sleeve 71 is mounted for rotation upon a cup-shaped member 70 one end of which is formed to have a radially extending flange 72. A sealing ring 65' is provided between the sleeve 71 and the peripheral surface of the cup-shaped member 70. Rotatability of the sleeve 71 and, hence, the bellows 14 relative to the cup-shaped member 72 is enhanced by the provision of a bushing 69.

As in the embodiment of FIG. 6, the resilient chamber 1 of the embodiment of FIG. 7 is seen to be located above the housing 5. Elements which function in a manner substantially equal to the function of elements in previously described embodiments will be identified by the same reference characters.

The apparatus of this embodiment is mounted on the mass, i.e. the chassis of an automotive vehicle by means of a compound bracket 12'. The bracket 12' comprises two cup-shaped members 12a and 12b welded together at their bottom surfaces. A bearing block 80 made of an elastomeric material is seated within an axial aperture of the bracket 12'. Preferably, the block 80 is connected to the bracket 12' by vulcanization. the piston rod 9' is seen to extend through an axial bore of the block 80 and is connected to the block 80 by means of washers 84 and 86 engaging opposite axial surfaces of the block 80, and a nut 82.

The rolling bellows 14 in accordance with this embodiment, is connected to the peripheral surface of the cup-shaped member 12a in an air-tight manner. Thus pivoting movements in directions normal to the axis of the piston rod 9' are absorbed by the elastic bearing block 80 and the bellows 14 without generating adverse torques.

As will be appreciated by persons skilled in the art the invention as described in connection with the above embodiments provides a spring-loaded damping apparatus which may advantageously be used as a strut in connection with automotive wheel suspension, for providing pivotal movement about axes parallel to the longitudinal and vertical axes of vehicles. The embodiments have been described as examples only and are not intended to describe the invention in any limited sense. The scope of protection sought for the inventive concept is to be derived from the appended claims.

What is claimed is:

1. A pneumatic spring-loaded damping apparatus, comprising:
    a substantially cylindrical housing including first and second closure means for closing opposite ends of said housing;
    first mounting means adjacent one of said first and second closure means for mounting said apparatus;
    piston means mounted for reciprocating movement along a predetermined axis within said housing and for dividing said housing into first and second absorption chambers of complementarily increasable and decreasable volumes;
    throttle means provided in said piston means for bidirectional exchange of pressure between said first and second absorption chambers;
    a piston rod having one end rigidly mounted on said piston means and having a section extending through one of said first and second absorption chambers and through one of said closure means;
    second mounting means affixed to said section of said piston means;
    means mounted for rotation about said predetermined axis on one of said housing and said section of said piston rod;
    a resilient substantially tubular bellows having a predetermined effective radius and affixed to said means mounted for rotation and the other of said housing and said section of said piston rod for forming a resilient sealed chamber; and
    annular sealing means provided between said means mounted for rotation and said one of said housing and said section of said piston rod and having a radius substantially equal to said effective radius of said tubular bellows.

2. The apparatus of claim 1, wherein said means mounted for rotation comprises a sleeve coaxially mounted on said one of said housing and said section of said piston rod for rotation relative thereto.

3. The apparatus of claim 2, wherein said sealing means comprises a ring of toroidal configuration.

4. The apparatus of claim 2, wherein said tubular bellows comprises a rolling bellows and wherein one of said sleeve and the other of said housing and said section of said piston rod provides a rolling surface for said bellows.

5. The apparatus of claim 4, wherein one of said first and second mounting means comprises a plate member having a substantially semispherical recess therein coaxially aligned with said apparatus, a bolt concentrically extending from said recess, a resilient member seated on said bolt within said recess and retained therein by a clamping member having a clamping surface configured to extend substantially parallel to said semispherical recess.

6. The apparatus of claim 4, wherein one of said first and second mounting means comprises a plate member having a substantially semispherical recess therein coaxially aligned with said apparatus, a bolt concentrically extending from said recess, a resilient member seated on said bolt within said recess and retained therein by a clamping member comprising a disc seated on said bolt and retained thereon by a member extending normal to said bolt and having an edge portion in engagement with said disc.

7. A pneumatic spring-loaded damping apparatus, comprising:
    a housing for providing a substantially cylindrical pneumatic absorption chamber and including means for closing said cylindrical chamber at opposite ends thereof;
    piston means provided within said cylindrical chamber for reciprocal movement along a predetermined axis between said opposite ends and for dividing said cylindrical chamber into first and second sections;
    a piston rod affixed to said piston means and having a portion extending through one of said closing means to the exterrior of said housing;
    means mounted for rotation about said predetermined axis on one of said housing and said portion of said piston rod;
    a substantially tubular resilient bellows having a predetermined effective radius and being substantially concentrically aligned relative to said predetermined axis, one end of said bellows being affixed to said means mounted for rotation, the other end being affixed to the other of said housing and said portion of said piston rod for forming a resilient pressure chamber between said housing and said piston rod; and
    means for providing a substantially hermetic seal between said means mounted for rotation and said one of said housing and said portion of said piston rod, said means for providing said seal comprising an annular member having a radius substantially equal to said predetermined effective radius of said tubular bellows.

8. The apparatus of claim 7, wherein said means mounted for rotation comprises a sleeve coaxially mounted on said one of said housing and said portion of said piston rod for rotation relative thereto.

9. The apparatus of claim 7, wherein said means for providing said seal comprises a toroidal ring of elastic material.

10. The apparatus of claim 7, wherein said tubular bellows comprises a rolling bellows and wherein one of said sleeve and the other of said housing and said portion of said piston rod provides a rolling surface for said bellows.

11. The apparatus of claim 1, wherein said section of said piston rod comprises a cup-shape member resiliently mounted on said piston rod and wherein said bellows is affixed to the periphery of said cup-shaped member.

12. The apparatus of claim 11, wherein said second mounting means comprises a bell-shape member in back-to-back engagement with said cup-shape member and wherein wherein said bell-shape member and said cup-shape member are held together by resilient means connected to said section of said piston rod.

* * * * *